(12) United States Patent
Broadfield

(10) Patent No.: US 11,518,202 B2
(45) Date of Patent: Dec. 6, 2022

(54) VEHICLE SENSOR UNIT AND ASSOCIATED CONTROLLER

(71) Applicant: Wheely-Safe, Staffordshire (GB)

(72) Inventor: Gary Broadfield, Staffordshire (GB)

(73) Assignee: Wheely-Safe, Staffordshire (GB)

( * ) Notice: Subject to any disclaimer, the term of this patent is extended or adjusted under 35 U.S.C. 154(b) by 678 days.

(21) Appl. No.: 16/469,115

(22) PCT Filed: Dec. 8, 2017

(86) PCT No.: PCT/GB2017/053692
§ 371 (c)(1),
(2) Date: Jun. 12, 2019

(87) PCT Pub. No.: WO2018/109443
PCT Pub. Date: Jun. 21, 2018

(65) Prior Publication Data
US 2020/0094632 A1     Mar. 26, 2020

(30) Foreign Application Priority Data
Dec. 12, 2016   (GB) .................................... 1621101

(51) Int. Cl.
*B60C 23/04*    (2006.01)
*B60C 23/06*    (2006.01)
*G07C 5/02*     (2006.01)

(52) U.S. Cl.
CPC ........ *B60C 23/061* (2013.01); *B60C 23/0481* (2013.01); *G07C 5/02* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| 6,914,523 B2 | 7/2005 | Munch et al. |
| 2005/0046559 A1 | 3/2005 | Kulha |

(Continued)

FOREIGN PATENT DOCUMENTS

| CN | 1942749 A | * | 4/2007 | ......... B60C 23/0408 |
| CN | 103208139 | | 7/2013 | |

(Continued)

OTHER PUBLICATIONS

International Preliminary Report on Patentability for corresponding PCT Application No. PCT/GB2017/053692 dated Jun. 27, 2019, 8 pages.

(Continued)

*Primary Examiner* — Andre J Allen
(74) *Attorney, Agent, or Firm* — Lee & Hayes, P.C.

(57) ABSTRACT

Methods and apparatus forming part of a vehicle sensor system (100) comprising a plurality of sensor units (104a-f) and a controller (102). A sensor unit comprises: a motion sensor (417) configured to determine a first speed of the sensor unit; and a transmitter (402) configured to transmit first identification data to the controller if the first speed of the sensor unit exceeds a first threshold. The motion sensor is further configured to determine a second speed of the sensor unit a period of time after determination of the first speed of the sensor unit, and the transmitter is configured to transmit to the controller second identification data if the second speed of the sensor unit exceeds a second threshold. The controller comprises: a receiver (304) configured to receive the first identification data, and further configured to receive the second identification data a period of time later; and a sensor unit assigner (320) configured to assign the sensor unit to the controller if the first identification data and the second identification data are received.

20 Claims, 5 Drawing Sheets

(58) Field of Classification Search
CPC . B60C 23/0433; B60C 23/0493; B60C 19/00; B60C 23/04; B60C 23/01; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

U.S. PATENT DOCUMENTS

| | | | |
|---|---|---|---|
| 2008/0243327 A1 | 10/2008 | Bujak et al. | |
| 2014/0019035 A1* | 1/2014 | Fink | G01M 17/013 701/300 |
| 2015/0193992 A1* | 7/2015 | Kumar | G07C 5/0808 701/29.2 |
| 2016/0059647 A1 | 3/2016 | Deniau et al. | |
| 2016/0229236 A1* | 8/2016 | Taki | B60C 23/0489 |
| 2019/0329605 A1* | 10/2019 | Fischer | B60C 23/0489 |

FOREIGN PATENT DOCUMENTS

| | | | | |
|---|---|---|---|---|
| GB | 2542136 A | * | 3/2017 | ............ B60B 3/14 |
| KR | 101388622 | | 4/2014 | |
| WO | WO2014056078 | | 7/2014 | |
| WO | WO-2017029381 A1 | * | 2/2017 | |

OTHER PUBLICATIONS

GB Search Report for corresponding GB Patent Application No. GB1621101.3 dated Jun. 19, 2017, 4 pages.
PCT Search Report from corresponding PCT Application No. PCT/GB2017/053692 dated Feb. 26, 2018, 8 pages.

* cited by examiner

VEHICLE SENSOR UNIT AND ASSOCIATED CONTROLLER

This Application is a US National Phase application filed under 35 USC § 371 of PCT Application PCT/GB2017/053692, filed Dec. 8, 2017, which claims priority to UK Application 1621101.3, filed Dec. 12, 2016, which is incorporated herein by reference.

TECHNICAL FIELD

The invention relates to vehicle sensor systems. More specifically, the invention relates to, but need not be limited to, a controller and/or plurality of vehicle sensors attached to the wheels of a vehicle, such as wheel loss sensors and tyre pressure sensors.

BACKGROUND

It is desirable for vehicle sensor systems to be simple and fool-proof from the perspective of the end user and also from the perspective of the operative fitting the system. This simplicity helps to ensure that the system is correctly deployed on a vehicle each and every time. In the case of a wheel loss sensors, the intention is to reduce preventable wheel loss incidents. In the case of tyre pressure monitoring systems (TPMS), the intention is to alert users of a vehicle to tyre pressures outside of normal limits.

Wheel loss sensor systems are designed to warn of impending wheel loss by detecting that a wheel is moving away from a secure position in contact with its axle. This detection of unwanted movement may be achieved by sensors attached to each wheel of a vehicle. The sensors communicate with a controller, which may be mounted in the vehicle, by means of radio-frequency transmitters and receivers.

As the wheel loss alarm system is a safety system, warnings provided by the system must be accurate. Warnings should not be generated when there are no problems with the wheels. In addition, warnings must be generated when there are problems with the wheels. Further, warnings should not be indicated in respect of other vehicles to which other sensors are attached (for example if the other vehicle is also fitted with a similar wheel loss alarm system).

In known wheel loss alarm systems, the controller and the vehicle sensors are independent and any vehicle sensor can work with any controller. The controller needs to know which vehicle sensors are attached to the wheels of the vehicle and pay attention to alarm conditions sent only by those sensors. The same requirement may apply to other vehicle sensor systems, such as TPMS. The requirement is most relevant to sensors that are fitted to replaceable items on a vehicle, such as wheels. This is known as 'registering' or 'pairing' a vehicle sensor with a controller so that the controller receives the data from the sensors fitted to the vehicle and only those sensors. Typically, vehicle sensors and their locations are manually recorded based on some unique characteristic of the vehicle sensor, such as an identification number, for example. The recorded data is then input to the controller so that it can recognise the correct sensors. The details of this process differ according to manufacturer, but generally involve placing the sensors into a specific mode of operation, in a specific order, whilst the vehicle is stationary. Not only is this cumbersome, it is also prone to errors of process and omission. Ultimately such a manual approach is not compatible with safety or simplicity.

SUMMARY

Exemplary methods and apparatus aim to simplify the fitting and assignment of vehicle sensors to vehicle wheels. Exemplary methods and apparatus reduce the operation of fitting vehicle sensors to one action, that of physically attaching a sensor to a wheel. All other actions required to register the sensor with a controller, which may be on the vehicle, are automatic and require no user intervention.

Exemplary methods and apparatus implement a reliable automated sensor registration process. The benefits of this include: a reduction in installer error; the reduction or elimination of incorrect or omitted sensor registration; increased installation speed; increased convenience; and increased system efficacy.

In summary, a problem addressed by the methods and apparatus disclosed herein may be defined as one of reliably and quickly detecting which sensors are on a vehicle without any prior knowledge of the sensors' unique characteristics, whilst discriminating the sensors attached to the local vehicle from other sensors.

According to an aspect of the invention, there is provided a sensor unit for use in a vehicle sensor system comprising a controller and at least one further sensor unit, the sensor unit comprising: a motion sensor configured to determine a first speed of the sensor unit; and a transmitter configured to transmit first identification data to the controller if the first speed of the sensor unit exceeds a first threshold, wherein the motion sensor is further configured to determine a second speed of the sensor unit a period of time after determination of the first speed of the sensor unit, and wherein the transmitter is configured to transmit to the controller second identification data if the second speed of the sensor unit exceeds a second threshold.

Optionally, the motion sensor is configured to determine the second speed of the sensor unit if the transmitter has transmitted the first identification data.

Optionally, the transmitter is configured to transmit each of the first and second identification data a plurality of times within first and second transmission periods respectively.

Optionally, the sensor unit further comprises a sleep controller configured to place the sensor unit in a low power mode if the first speed of the sensor unit does not exceed the first threshold within a first checking period and/or the second speed of the sensor unit does not exceed the second threshold within a second checking period.

Optionally, the motion sensor is configured to determine the first and second speeds of the sensor unit a plurality of times within the first and second checking periods respectively, and further configured to stop determining the first and second speeds of the sensor unit after expiry of the corresponding checking period.

Optionally, the motion sensor is configured to sense a change in rotational position of the sensor unit and to determine the first speed of the sensor unit if the sensed change in rotational position is above a threshold.

Optionally, the first threshold and the second threshold have the same value.

According to a further aspect of the invention, there is provided a method for operation of a sensor unit for use in a vehicle sensor system comprising a controller and at least one further sensor unit, the method comprising: determining, by a motion sensor, a first speed of the sensor unit; and transmitting, by a transmitter, first identification data to the controller if the first speed of the sensor unit exceeds a first threshold; determining, by the motion sensor, a second speed of the sensor unit a period of time after determination of the first speed of the sensor unit; and transmitting, by the transmitter second identification data to the controller if the second speed of the sensor unit exceeds a second threshold.

Optionally, the motion sensor determines the second speed of the sensor unit if the transmitter has transmitted the first identification data.

Optionally, the transmitter transmits each of the first and second identification data a plurality of times within first and second transmission periods respectively.

Optionally, the method further comprises a sleep controller placing the sensor unit in a low power mode if the first speed of the sensor unit does not exceed the first threshold within a first checking period and/or the second speed of the sensor unit does not exceed the second threshold within a second checking period.

Optionally, the motion sensor determines the first and second speeds of the sensor unit a plurality of times within the first and second checking periods respectively, and stops determining the first and second speeds of the sensor unit after expiry of the corresponding checking period.

Optionally, the motion sensor senses a change in rotational position of the sensor unit and determines the first speed of the sensor unit if the sensed change in rotational position is above a threshold.

Optionally, the first threshold and the second threshold have the same value.

According to a further aspect of the invention, there is provided a controller for use in a vehicle sensor system for assigning a plurality of sensor units to a vehicle, the controller comprising: a receiver configured to receive first identification data from at least one of the plurality of sensor units, and further configured to receive second identification data from the at least one of the plurality of sensor units a period of time later; and a sensor unit assigner configured to assign to the controller the at least one of the plurality of sensor units if the first identification data and the second identification data are received.

The plurality of sensor units may comprise sensor units fitted to the same vehicle as the controller and sensor units not fitted to the vehicle and optionally fitted to another vehicle. Optionally, the controller is configured not to discriminate between sensor units fitted to the vehicle and sensor units not fitted to the vehicle during the assignment of the plurality of sensor units to the vehicle.

Optionally, the controller further comprises a memory configured to store data relating to a plurality of previously assigned sensor units, and wherein the sensor unit assigner is configured to retrieve data from the memory to determine whether the at least one of the plurality of assigned sensors has previously been assigned to the controller and to store data relating to the at least one assigned sensors in the memory if it has not been previously assigned to the controller.

Optionally, the memory is configured to store data relating to a maximum number of the most recent sensor units assigned to the controller.

Optionally, the sensor unit assigner is configured to retrieve the data relating to the previously assigned sensor units from the memory at the beginning of a journey of the vehicle and to assign to the controller previously assigned sensor units corresponding to the retrieved data.

Optionally, the sensor unit assigner is configured to assign the at least one of the plurality of sensor units to the controller if the second identification data is received within a listening period beginning with receipt of the first identification data.

According to the invention in a further aspect, there is provided a method for operating a controller for use in a vehicle sensor system for assigning a plurality of sensor units to a vehicle, the method comprising: receiving, by a receiver, first identification data from at least one of the plurality of sensor units; receiving, by the receiver, second identification data from the at least one of the plurality of sensor units a period of time later; and assigning, by a sensor unit assigner, to the controller the at least one of the plurality of sensor units if the first identification data and the second identification data are received.

Optionally, the method further comprises retrieving, by the sensor unit assigner, data relating to a plurality of previously assigned sensor units from a memory; determining, by the sensor unit assigner, whether the at least one of the plurality of assigned sensors has previously been assigned to the controller; and storing, by the sensor unit assigner, data relating to the at least one assigned sensor in the memory if it has not been previously assigned to the controller.

Optionally, the memory stores data relating to a maximum number of the most recent sensor units assigned to the controller.

Optionally, the method further comprises the sensor unit assigner retrieving the data relating to the previously assigned sensor units from the memory at the beginning of a journey of the vehicle and assigning to the controller previously assigned sensor units corresponding to the retrieved data.

Optionally, the method further comprises the sensor unit assigner assigning the at least one of the plurality of sensor units to the controller if the second identification data is received within a listening period beginning with receipt of the first identification data.

According to the invention in a further aspect, there is provided a controller for use in a vehicle sensor system for monitoring a characteristic of a vehicle, the controller comprising: a receiver configured to receive data from a plurality of sensor units, wherein at least part of the received data comprises data identifying each sensor unit; a sensor correlator configured to determine a correlation between at least a part of the received data from each sensor unit; and a sensor determiner configured to determine a set of the plurality of sensor units to be assigned to the controller based on the determined correlation.

Optionally, the sensor determiner is configured to determine the set of the plurality of sensor units is to be assigned if the determined correlation is above a threshold value.

Optionally, the sensor correlator is configured to determine a signal strength of the received data from each of the plurality of sensor units, and to determine the correlation based on the determined signal strength over a period of time.

Optionally, the receiver is configured to receive motion data relating to each sensor unit, and wherein the sensor correlator is configured to determine the correlation based on the received motion data over a period of time.

Optionally, the received motion data comprises accelerometer data.

Optionally, the sensor correlator is configured to determine the angular rate of the sensor units, and to determine the correlation based on the determined angular rate.

Optionally, the data identifying the sensor unit comprises data indicating a location of the sensor unit on the vehicle, for example, the wheel to which the sensor is fitted.

Optionally, the controller further comprises a checker configured to check the indicated location of each of the set of sensor units and to generate an error indication if one or more of the following occurs: a plurality of sensor units indicate the same location; and a sensor unit indicates a location that does not correspond to a location on the vehicle.

According to the invention in another aspect, there is provided a method for determining a set of sensor units fitted to a vehicle for use in a vehicle sensor system for monitoring a characteristic of the vehicle, the method comprising: receiving, by a receiver, data from a plurality of sensor units, wherein at least part of the received data from each sensor unit comprises data identifying that sensor unit; determining, by a sensor correlator, a correlation between at least a part of the received data from each sensor units; and determining, by a sensor determiner, a set of the plurality of vehicle sensor units to be assigned to the controller based on the determined correlation.

Optionally, the sensor determiner determines the set of the plurality of sensor units is to be fitted to the vehicle if the determined correlation is greater than a threshold value.

Optionally, the sensor correlator determines a signal strength of the received data from each of the plurality of sensor units, and determines the correlation based on the determined signal strength over a period of time.

Optionally, the receiver receives motion data relating to each sensor unit, and the sensor correlator determines the correlation based on the received motion data over a period of time.

Optionally, the received motion data comprises accelerometer data.

Optionally, the sensor correlator determines the angular rate of the sensor units, and determines the correlation based on the determined angular rate.

Optionally, the data identifying the sensor unit comprises data indicating a location of the sensor unit on the vehicle.

Optionally, the method further comprises a checker checking the indicated location of each of the set of sensor units and generating an error indication if one or more of the following occurs: a plurality of sensor units indicate the same location; and a sensor unit indicates a location that does not correspond to a location on the vehicle.

According to the invention in another aspect, there is provided a sensor unit for use in a vehicle sensor system for monitoring a characteristic of a vehicle, the vehicle sensor system comprising a controller and a plurality of sensor units, the sensor unit comprising: a sensor configured to collect data relating to the sensor unit, wherein at least part of the collected data may be correlated with data from at least one other sensor unit for determining a set of the plurality of sensor units is to be assigned to the controller based on that correlation; and a transmitter configured to transmit to the controller data relating to the collected data for determining the set of the plurality of sensor units to be assigned to the controller based on that correlation, wherein at least part of the transmitted data identifies the sensor unit.

Optionally, the data relating to the collected data comprises the collected data.

Optionally, the sensor is a motion sensor and the collected data comprises motion data relating to the sensor unit.

Optionally, the sensor is an accelerometer.

Optionally, the sensor unit is a sensor unit further comprising a wheel loosening sensor configured to detect loosening of a wheel of the vehicle.

Optionally, the sensor unit is a sensor unit further comprising a tyre pressure sensor configured to detect a tyre pressure of a wheel of the vehicle.

Optionally, the sensor unit further comprises a data processor configured to process the collected data to determine data that may be correlated with processed data from at least one other sensor unit for determining a set of the plurality of vehicle sensor units is fitted to a vehicle based on that correlation and wherein the data relating to the collected data comprises the processed data.

Optionally, the data processor is configured to determine one or more of: an acceleration, an angular rate, a velocity and a position of the sensor unit based on the collected data.

Optionally, the data identifying the sensor unit comprises data indicating a location of the sensor unit on the vehicle.

According to the invention in another aspect, there is provided a method for use in a sensor unit, the sensor unit for use in a vehicle sensor system for monitoring a characteristic of a vehicle, the vehicle sensor system comprising a controller and a plurality of vehicle sensor units and the method for allowing the determination of a set of sensor units to be assigned to the controller, the method comprising: collecting, by a sensor, data relating to the sensor unit, wherein at least part of the collected data may be correlated with data from at least one other sensor unit for determining a set of the plurality of sensor units is to be assigned to the controller based on that correlation; and transmitting, by a transmitter to the controller data relating to the collected data for determining the set of the plurality of sensor units is to be assigned to the controller based on that correlation, wherein at least part of the transmitted data identifies the sensor unit.

Optionally, the data relating to the collected data comprises the collected data.

Optionally, the sensor is a motion sensor and the collected data comprises motion data relating to the sensor unit.

Optionally, the sensor is an accelerometer.

Optionally, the sensor unit is a sensor unit further comprising a wheel loosening sensor for detecting loosening of a wheel of the vehicle.

Optionally, the sensor unit is a sensor unit further comprising a tyre pressure sensor for detecting a tyre pressure of a wheel of the vehicle.

Optionally, the method further comprises a data processor processing the collected data to determine data that may be correlated with processed data from at least one other sensor unit for determining a set of the plurality of vehicle sensor units is to be assigned to the controller based on that correlation, and wherein the transmitter transmits the processed data to the controller.

Optionally, the data processor determines one or more of: an acceleration, an angular rate, a velocity and a position of the sensor unit based on the collected data.

Optionally, the data identifying the sensor unit comprises data indicating a location of the sensor unit on the vehicle.

According to the invention in another aspect, there is provided a sensor unit for use in a vehicle sensor system for monitoring a characteristic of a vehicle, the vehicle sensor system comprising a controller and a plurality of sensor units, the sensor unit being one of a plurality of types of sensor unit, each type related to an intended location of the sensor unit in the vehicle sensor system, the senor unit comprising: a transmitter configured to transmit to the controller a sensor unit identifier and a sensor unit type identifier.

Optionally, the sensor unit further comprises a visual indication corresponding to the sensor unit type.

According to the invention in another aspect, there is provided a controller for use in a vehicle sensor system for monitoring a characteristic of a vehicle, the vehicle sensor system comprising a plurality of sensor units, the controller comprising: a receiver configured to receive from each of the plurality of sensor units a sensor unit identifier and a sensor unit type identifier; and a sensor determiner configured to determine the location of each of the plurality of sensors within the sensing system, based at least in part on the received sensor unit identifier and a sensor unit type identifier.

Optionally, the controller further comprises a checker configured to check the indicated location of each of the set of sensor units and to generate an error indication if one or more of the following occurs: a plurality of sensor units indicate the same location; and a sensor unit indicates a location that does not correspond to a location on the vehicle.

According to the invention in another aspect, there is provided a controller for use in a vehicle sensor system comprising a plurality of sensor units fitted to wheels of a vehicle, the controller for assigning the plurality of sensor units to the vehicle, and comprising: a receiver configured to receive identification data from the plurality of sensor units and at least one further sensor unit not fitted to the vehicle; and a sensor unit assigner configured to assign to the vehicle the plurality of sensor units and the at least one further sensor unit.

Optionally, the at least one further sensor unit is fitted to another vehicle.

Optionally, the receiver is configured to receive the identification data during a sensor assignment period, and the sensor unit assigner is configured to assign to the vehicle the plurality of sensor units and the at least one further sensor unit if the identification data is received during the sensor assignment period.

Optionally, the controller further comprises a vehicle motion monitor configured to determine whether the speed of the vehicle is greater than an assignment threshold value, and wherein the sensor assignment period begins when the vehicle is travelling at a speed greater than the assignment threshold value.

Optionally, the receiver is configured to enter a low power mode if the vehicle motion monitor determines that the vehicle is stationary for a time period exceeding a power saving threshold.

Optionally the sensor unit assigner is configured to unassign the assigned sensor units from the vehicle if the vehicle motion monitor determines that the vehicle is stationary for a time period exceeding a journey end threshold. In other arrangements, sensor units are not unassigned at the end of a journey, but are retained in a memory of "paired" (or previously paired) sensor units. The previously paired sensor units may be assigned to the controller on power-up. The memory size is larger than required to store the highest number of possible paired sensor units (e.g. 12 for car and/or 50 for bus and truck). A sensor unit may be unassigned when it becomes the "oldest" sensor unit to be in the memory and a new and not stored sensor unit is paired to the controller. This latest sensor unit to pair pushes the oldest paired sensor unit out of the memory.

Optionally, the receiver is configured to enter a normal mode if the vehicle motion monitor determines that the vehicle is moving after a time period exceeding the power saving threshold and less than the journey end threshold.

Optionally, the receiver is further configured to receive from the assigned sensor units parameter data relating to a parameter of the wheels of the vehicle, and the controller further comprises a data manager configured to monitor the parameter data for alerting a user if the parameter data is outside predetermined limits.

Optionally, the parameter data comprises one or more of: tyre pressure data, temperature data or wheel loosening data.

Optionally, the receiver is further configured to receive identification data from at least the plurality of sensor units and optionally one or more further sensor units during a further sensor assignment period, and the sensor unit assigner is further configured to determine sensor units common to the assignment period and the further sensor assignment period, and to unassign any sensor units that are not common.

According to a further aspect of the invention there is provided a sensor unit for use in a vehicle sensor system comprising a controller and one or more further sensor units fitted to wheels of a vehicle, the sensor unit comprising: a motion monitor configured to determine whether the vehicle speed of the sensor unit exceeds a sensor speed threshold value; and a transmitter configured, if the speed of the sensor unit exceeds the sensor speed threshold value, to transmit identification data to the controller.

Optionally, the transmitter is configured to end transmission of the identification data after a predefined period of time.

Optionally, the predefined period of time is one of: 60 seconds, 70 seconds, 80 seconds, 90 seconds, 100 seconds, 110 seconds and any time under 5 minutes.

Optionally, the transmitter is configured to end transmission of the identification data after transmitting the identification data a predefined number of times.

Optionally, the predefined number of times is one of: 5 or more; 10 or more; 15 or more; and 20 or more.

Optionally, each of the plurality of sensor units comprises a motion sensor configured to determine whether the vehicle speed of the sensor unit exceeds a sensor speed threshold value, and further comprises a transmitter configured, if the speed of the sensor unit exceeds the sensor speed threshold value, to transmit identification data to the controller.

Optionally, the transmitter is configured to end transmission of the identification data after a predefined period of time.

Optionally, the predefined period of time is one of: 60 seconds, 70 seconds, 80 seconds, 90 seconds, 100 seconds, 110 seconds and any time under 5 minutes.

Optionally, the transmitter is configured to end transmission of the identification data after transmitting the identification data a predefined number of times.

Optionally, the predefined number of times is one of: 5 or more; 10 or more; 15 or more; and 20 or more.

According to the invention in another aspect, there is provided a controller for use in a vehicle sensor system and for assigning a plurality of sensor units to the vehicle, the controller comprising: a receiver configured to receive identification data from the plurality of sensor units; and a sensor unit assigner configured to assign to the vehicle all sensor units from which identification data is received.

According to the invention in a further aspect, there is provided a computer program comprising instructions which, when executed on at least one processor, cause the at least one processor to carry out any method disclosed herein.

According to the invention in a further aspect, there is provided a carrier containing the computer program mentioned above, wherein the carrier is one of an electronic signal, optical signal, radio signal, or non-transitory computer readable storage medium.

According to the invention in a further aspect, there is provided a vehicle sensor system comprising: a plurality of sensor units according to any described herein; and a controller according to any described herein.

According to the invention in a further aspect, there is provided a vehicle comprising the vehicle sensor system mentioned above.

DETAILED DESCRIPTION

Figure 1:
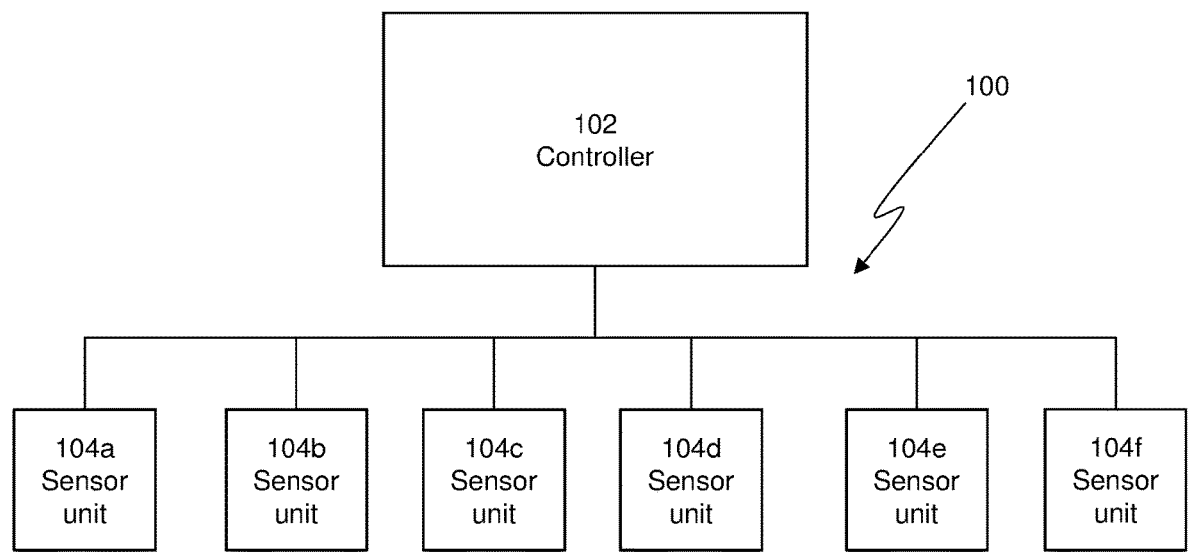
FIG. 1 is a schematic diagram of a wheel loosening/loss alarm system.

Generally, disclosed herein are methods and apparatus for assigning sensors to a sensor system in an environment that may comprise one or more sensor units that should be assigned to the vehicle and potentially also comprise one or more sensor units that should not be assigned to the sensor system. Therefore, methods and apparatus disclosed herein allow for the discrimination of sensor units that should be assigned to the sensor system from those that should not.

In addition, methods and apparatus disclosed may allow for a controller to locate a sensor unit within the sensor system. In exemplary methods and apparatus, this may comprise a sensor unit being associated with a particular location and transmitting data identifying that location. This may be combined with a visual indication for the operative fitting the sensor system, as discussed below.

Exemplary methods and apparatus particularly apply to vehicle sensor systems. Further, the sensor system may be configured to sense one or more characteristics of a vehicle, for example, such as wheel sensors that may detect wheel loosening and/or tyre pressure.

In other exemplary vehicle sensor systems, the controller may be configured not to discriminate between sensor units fitted to a vehicle and sensor units not fitted to that vehicle. Instead, the controller may be configured to assign to the controller, and therefore to the vehicle, all sensor units from which it receives identification data. This is counterintuitive based on known systems as sensor units not fitted to the vehicle may provide false positive indications to the controller. However, the inventors have realised that such false positives are statistically very unlikely as two vehicles are unlikely to be within range of each other for large sections of their journeys. Further, the inventors have realised that a false positive in the case of an alarm system, such as a wheel loss sensing system or a TPMS are not a safety hazard and only result in mild irritation for a user.

In other exemplary vehicle sensor systems, the controller may be configured to assign all sensor units from which it receives identification data twice, spaced apart in time. That is, the controller may assign sensor units from which it receives first identification data and then subsequently receives second identification data, which may be the same as the first identification data, some time later. The sensor units of the sensor system may be configured to transmit the first identification data if the speed of a motion sensor within the sensor unit is above a speed threshold. The speed of the sensor unit is a proxy for vehicle speed. The sensor unit may also be configured to transmit the second identification data a period of time after transmitting the first identification data, if the speed of the motion sensor is still above the speed threshold.

The inventors have realised that by only assigning sensor units from which both first identification data and second identification data is received, the statistical likelihood of sensor units fitted to other vehicles and which should not be assigned to the controller being assigned is very low. This is because it is very unlikely that two vehicles will remain within range of each other for long enough for the controller of one of the vehicles to receive both first identification data and second identification data from a sensor unit fitted to the other vehicle. Further, even if one of the sensor units from the other vehicle is assigned to the controller, it is unlikely that the two vehicles will remain within range of each other at a time when an alarm signal or other data relating to the sensor system is transmitted to the controller.

In view of the above, exemplary methods and apparatus may combine the two elements: sensor unit assignment; and sensor unit location. It is also noted that each element may be implemented separately. In exemplary methods and apparatus relating to vehicle sensor systems, one sensor unit type per intended wheel location may be used having a visual indicator to let installers know which wheel a sensor unit should be used on (e.g. front offside, front nearside etc.). A controller, which may be located inside the vehicle, may implement a method to identify signals from the sensor units on the local-vehicle. This may be done by correlating signals received from a plurality of sensor units, as explained in greater detail below.

Combined, these two elements provide sufficient information to the controller for it to identify the sensor units that should be assigned to the vehicle and to know which wheel each sensor is fitted to.

Two signals are considered to correlate when, for example, they are substantially constant with respect to each other over time. This may mean that the two signals are substantially equal in amplitude and in time displacement. However, two signals may also be correlated if there is a substantially constant offset between them over time. In addition, two signals may be correlated if they vary over time at substantially the same rate, but are time shifted.

The inventors have appreciated that for less sensitive systems, discriminating between sensor units fitted to the vehicle and sensor units not fitted to the vehicle may add extra cost and complexity to the vehicle sensor system. For example, it may be necessary to incorporate more sensitive accelerometers or other measuring devices into the sensor system. Therefore, in exemplary methods and apparatus the controller is configured to assign to the sensor system (or vehicle) all of those sensor units from which it receives identification data. Therefore, in exemplary methods and apparatus, both the plurality of sensor units fitted to the vehicle and at least one further sensor unit not fitted to the vehicle may be assigned to the vehicle sensor system.

FIG. 1 shows a schematic representation of a vehicle sensor system 100. The sensor system 100 comprises a controller 102 in electrical communication with a plurality of sensor units 104a-f. As used herein, the term "electrical communication" encompasses the communication of data between entities and, specifically, may encompass the direct communication of data between entities, wherein the data comprises information for allowing the system as a whole to operate as described herein. The electrical communication may be wireless.

The controller 102 is configured to work with any sensor units 104a-f and is therefore configured to receive data from each of those sensor units. There may also exist a plurality of other controllers 102 that are also configured to receive data from all of the sensor units 104a-f. As such, any controller 102 may be configured to receive data from any sensor unit 104a-f. In such circumstances, each of the sensor units 104a-f that is fitted to a particular vehicle must be identified against all other sensor units 104a-f that are also within range of the controller 102 and therefore able to communicate with the controller 102. Only six sensor units 104a-f are shown in FIG. 1, but it is noted that any number of sensor units 104a-f may be used in the sensor system 100.

Figure 2:
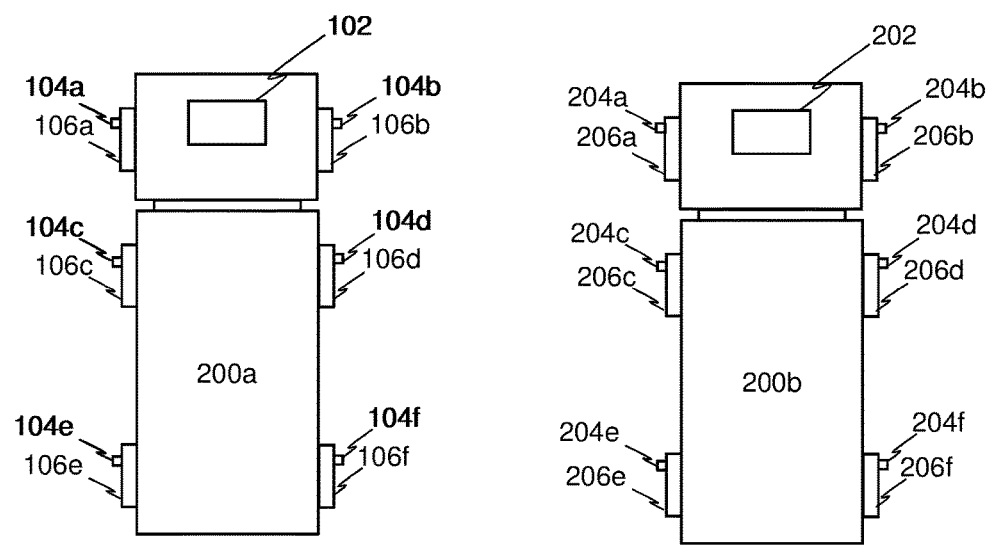
FIG. 2 is a schematic showing a plurality of vehicles with wheel loss/loosening alarm systems fitted.

FIG. 2 shows two exemplary vehicles (e.g. trucks) 200a, 200b, each comprising a vehicle sensor system. A first vehicle 200a comprises a first vehicle sensor system comprising a first controller 102 and a first plurality of sensor units 104a-f fitted to the wheels 106a-f of the vehicle 200a. A second vehicle 200b comprises a second vehicle sensor system comprising a second controller 202 and a second plurality of sensor units 204a-f fitted to the wheels 206a-f of the vehicle 200b.

Each sensor system may determine the set of all the sensor units 104a-f, 204a-f that are to be assigned to its vehicle. As explained in detail below, the first controller 102 (and/or the sensor units 104a-f, 204a-f) may be configured to determine data relating to each sensor unit 104a-f, 204a-f that can be correlated with similar data relating to other sensor units 104a-f, 204a-f and to determine the set of sensor units 104a-f that should be assigned (or paired) to the controller 102. If the correlation between the data relating to a number of the sensor units is above a threshold then those sensor units are determined to form part of the set to be assigned to the controller 102.

Assignment of sensors to a controller may also be required, for example, if a wheel is changed and/or if sensors are in a maintenance area, such as a garage, and not fitted to the vehicle.

Figure 3:
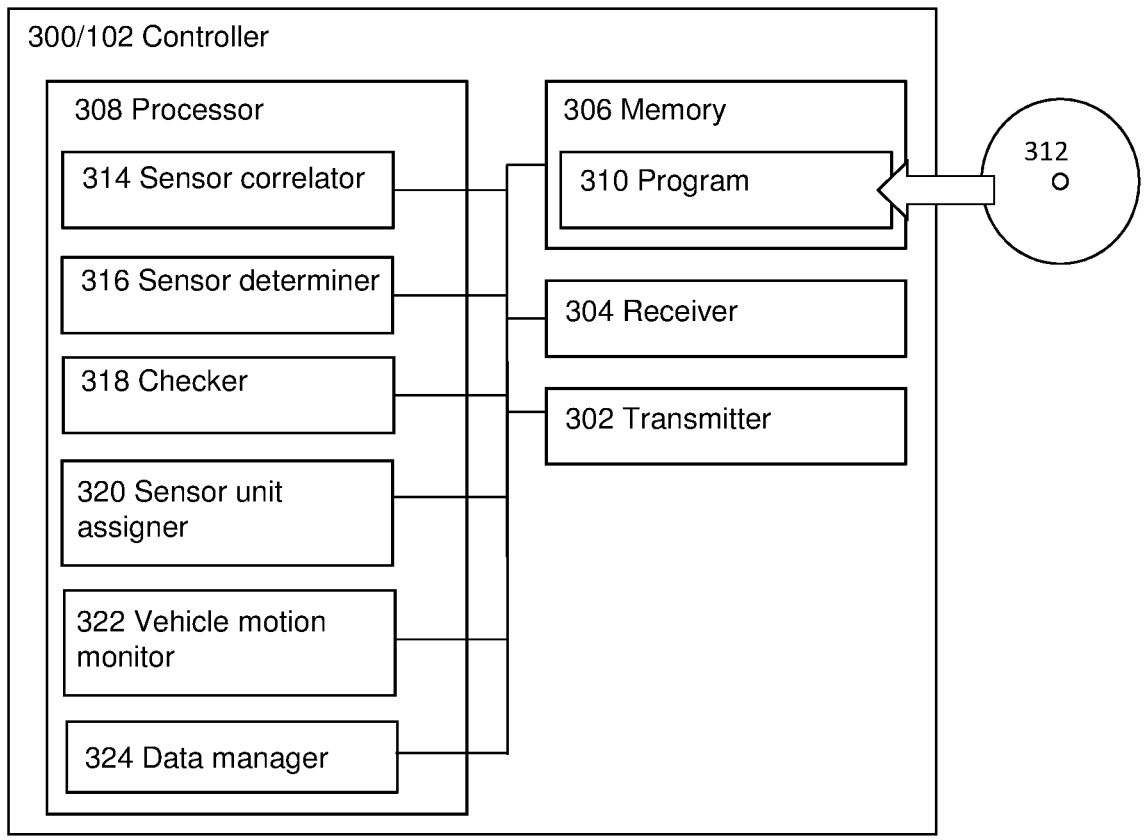
FIG. 3 is a schematic diagram of a controller.

FIG. 3 shows a schematic representation of a controller 300, which may be the controller 102, 202 in FIGS. 1 and 2. The controller 300 comprises a transmitter 302 and a receiver 304. The transmitter 302 and receiver 304 may be in data communication with other entities in a network, such as sensor units 104, 204, servers and/or functions in a telecommunications network and are configured to transmit and receive data accordingly.

The controller 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake one or more of the functions of a sensor correlator 314, sensor determiner 316, checker 318, sensor unit assigner 320, vehicle motion monitor 322 and data manager 324, as set out below.

Each of the transmitter 302 and receiver 304, memory 306, processor 308, sensor correlator 314, sensor determiner 316, checker 318, sensor unit assigner 320, vehicle motion monitor 322 and data manager 324 is in data communication with the other features 302, 304, 306, 308, 310, 314, 316, 318, 320, 322, 324 of the controller 300. The controller 300 can be implemented as a combination of computer hardware and software. In particular, the sensor correlator 314, sensor determiner 316, a checker 318, sensor unit assigner 320, vehicle motion monitor 322 and data manager 324 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include the sensor correlator 314, sensor determiner 316, a checker 318, sensor unit assigner 320, vehicle motion monitor 322 and data manager 324, but are not limited to such.

Figure 4:
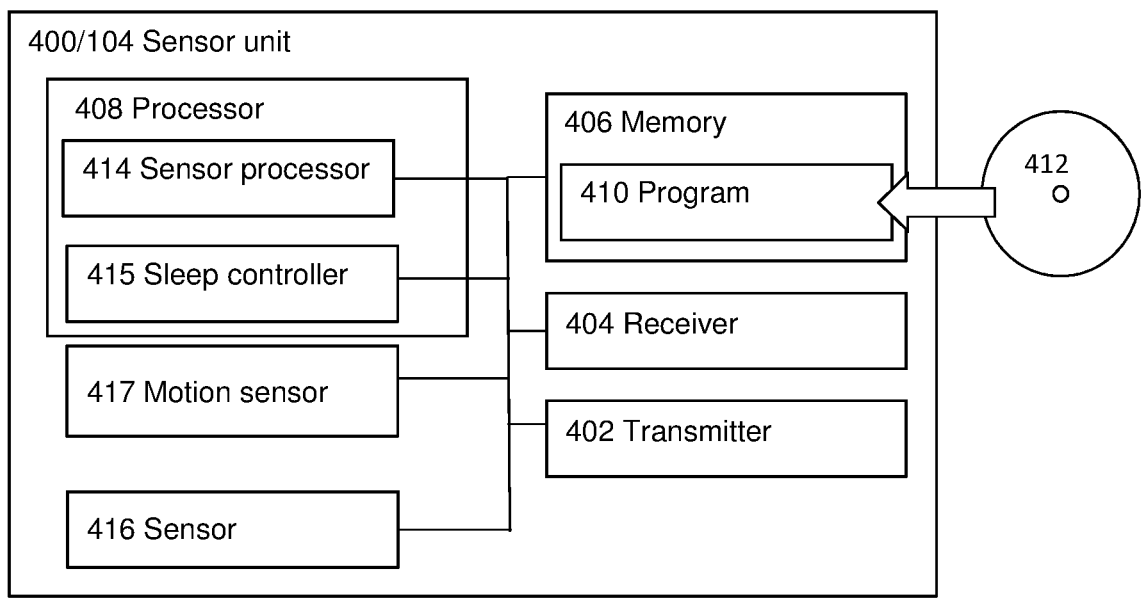
FIG. 4 is a schematic diagram of a sensor unit.

FIG. 4 shows a schematic representation of a sensor unit 400, which may be the sensor unit 104, 204 in FIGS. 1 and 2. The sensor unit 400 comprises a transmitter 402 and a receiver 404. The transmitter 402 and receiver 404 may be in data communication with other network entities such as a controller 102, 202, servers and/or functions in a telecommunications network and are configured to transmit and receive data accordingly.

The sensor unit 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake the function of at least a sensor processor 414 and a sleep controller 415 as set out below. The sensor unit also comprises at least one sensor 416 and a motion sensor 417. In exemplary methods and apparatus, the at least one sensor 416 is configured to collect data allowing correlation between sensors to determine the set of sensor units 104, 204 to be assigned to a controller 102, 202. In exemplary methods and apparatus, the at least one motion sensor 417 is configured to collect data relating to the speed and/or angular position of the sensor unit 104, 204. Exemplary sensor units may comprise further sensors to collect data relating to a characteristic of the vehicle.

Each of the transmitter 402 and receiver 404, memory 406, processor 408, sensor processor 414, sensor 416 and motion sensor 417 is in data communication with the other features 402, 404, 406, 408, 410, 414, 415, 416, 417 of the sensor unit 400. The sensor unit 400 can be implemented as a combination of computer hardware and software. In particular, the sensor processor 414, the sleep controller 415, the motion sensor 417 and control of the sensor 416 may be implemented as software configured to run on the processor 408. The memory 406 stores the various programs/executable files that are implemented by a processor 408, and also provides a storage unit for any required data. The programs/executable files stored in the memory 406, and implemented by the processor 408, can include the sensor processor 414, the sleep controller 415, the motion sensor 417 and control of the sensor 416, but are not limited to such.

Automating sensor assignment may present the problem of discriminating at the controller 102 which sensor units 104 are part of the local sensor system, for example which sensor units 104 are fitted to a vehicle 200a, without any prior knowledge of those sensor units 104. In exemplary methods and apparatus, possible approaches to discriminate between sensor units 104 include determining at the controller 102 the received signal strength from each sensor and recording that signal strength for a sufficient length of time that the controller 102 can determine the set of sensor units 104 that should be assigned to the controller 102. This may be done by recording all identification numbers from sensor units within range of the controller 102. Over time, only the sensor units on the vehicle will be left in range or a consistent list of sensor units within range can be built up. This may enable the controller to determine the set of sensor units. Further, the controller may determine a correlation between the recorded signal strengths between all of the sensors. Only the sensor units whose signal strengths remain relatively constant with respect to the other sensor units are considered to be correlated and, provided the determined correlation is above a threshold value, those sensor units are determined to be the set of sensor units.

Another approach is to measure a property of the sensor units that may be correlated with a similar measurement from other sensor units to some degree of predictable tolerance. In exemplary systems using sensor units common to all wheels on a particular vehicle the angular rate or speed of rotation may be used. Alternatively, another motion based property of the sensor, such as velocity or relative position may be used.

In the example of angular rate, it is noted that a vehicle's speed will vary continuously throughout a journey, however, the wheels of the vehicle will all rotate at approximately the same rate at all times. There will be some variation induced by, for example, going around a corner or differing tyre pressures but allowing for these variations the wheel rotation speeds will correlate to a significant degree. This property may be exploited by methods and apparatus disclosed herein to detect, at the controller, the set of sensors that have a correlated rotational speed from the perspective (or coordinate system) of that particular controller. The sensor units selected in this way are then assigned to the vehicle by the controller.

Figure 5:
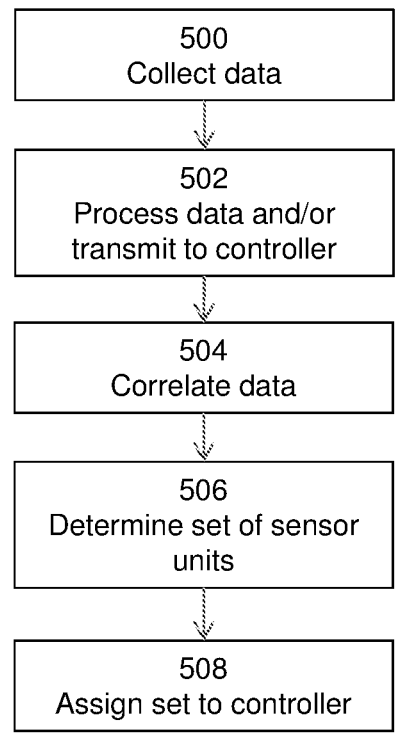
FIG. 5 is a flow diagram of a method for assigning a set of sensor units from a plurality of sensor units to a controller.

FIG. 5 shows a flow diagram of a method for assigning a set of sensor units 104 from a plurality of sensor units 104, 204 to a controller 102.

The sensor 416 and/or the motion sensor 417 of each sensor unit 104 collects 500 data relating to the sensor unit. At least a part of the collected data may be correlated with similar data collected at other sensor units. For example, the collected data may comprise motion data for the sensor unit 104. The motion data for each sensor unit 104 of the set of sensor units may be correlated with motion data for another of the sensor units in the set, as they will experience substantially similar motion. The collected data may be processed before correlation.

As set out above, the data may comprise acceleration data, e.g. from the motion sensor 417, which may be an accelerometer, in the sensor unit 104.

In exemplary methods and apparatus, there may be no need to collect data at the sensor unit 104 that may be correlated to data from other sensor units. For example, if the strength of the signals transmitted to the controller 102 may be used to determine the set of sensor units 104 then it is not necessary to collect this data as a separate act. The necessary data will be included in the transmissions from the sensor unit 104 to the controller 102.

The sensor processor 416 may process the collected data locally at the sensor unit 104. For example, where an accelerometer is used to collect the correlatable data then this may be processed from its raw state to show acceleration, velocity or relative position of the sensor unit 104 before transmission to the controller 102. In other methods and apparatus, the collected data may be transmitted raw, in which case a sensor processor in the controller 102 may process the raw collected data. This may be done by the sensor correlator 314. The transmission is undertaken in step 502. It is noted that an identifier, such as a unique identifier number, for each sensor unit 104, 204 may also be transmitted to the controller 102.

In exemplary apparatus, the motion sensor 417 may be a MEMS accelerometer embedded into the sensor unit and data from the accelerometer is used to deduce rotational speed of the sensor unit. For example, the acceleration due to gravity measured on one axis of the accelerometer superimposes a sinusoidal signal onto the collected data. The frequency of this signal is the rotational speed of the wheel in Hz.

The sensor correlator 314 determines 504 a correlation between the received data from the plurality of sensor units 104, 204. This may be done using received data collected over a time period. If the data received from particular sensor units 104 correlates to a sufficient degree (accounting for acceptable tolerances), for example if a value of correlation is above a threshold, then the sensor determiner 316 determines 506 that those sensor units 104 are part of the set of sensor units 104 that may be assigned to the controller 102. The sensor determiner then assigns 508 the determined set to the controller 102. The other sensor units 204 are determined not to form part of the set to be assigned to the controller 102.

Sensor assignment is a controller function. The controller 102 takes data from all sensor units 104, 204 in range and looks for a set of sensor units 104 that are reporting correlated rotational speeds (or other correlatable data). The correlation could take the form of absolute rotational speeds that are substantially (i.e. within a tolerance) the same. It could also take the form of sensor units that are reporting substantially equivalent rates of change of rotational speed. Or it could be a combination of both absolute rotational speed and rate of change of rotational speed.

The controller 102 may continue to make an assessment of the sensor units 104, 204 until it has assigned the expected number of correlated sensor units 104 of each wheel type to the local vehicle 200*a*. From then on the receiver may choose to ignore all other sensor units 204 or it may choose to continually or periodically reassess which sensor units should be assigned to the local vehicle 200*a*.

There are several options regarding the actual data that is sent by the sensor for the purposes of assignment to a vehicle. These include: sending raw accelerometer data, sending calculated angular rate data; sending data all the time or for only a period after a vehicle start has been detected. Vehicle start could be detected by the accelerometer itself, vehicle stop could be similarly detected with a timeout to reject brief pauses in a journey. In addition, if a vehicle stop is detected then the controller 102 may place the sensor system in sleep mode to reduce energy usage. As such, the controller 102 may transmit a message to each assigned sensor unit 104 to place it in sleep mode. In alternative methods and apparatus, a sensor unit may comprise a sleep controller 415. The sleep controller may be configured to monitor the motion of the sensor unit and, if the vehicle is determined to be stationary, place the sensor unit into sleep mode, in which power consumption is reduced or minimised. The sleep controller 415 may be configured to enter sleep mode when the vehicle has been stationary for a time exceeding a threshold, for example, five minutes. When the sensor unit 104 moves then the sleep controller 415 will detect the movement and "wake-up" the sensor unit 104 by increasing the power to the unit such that full operation is possible.

Figure 6:
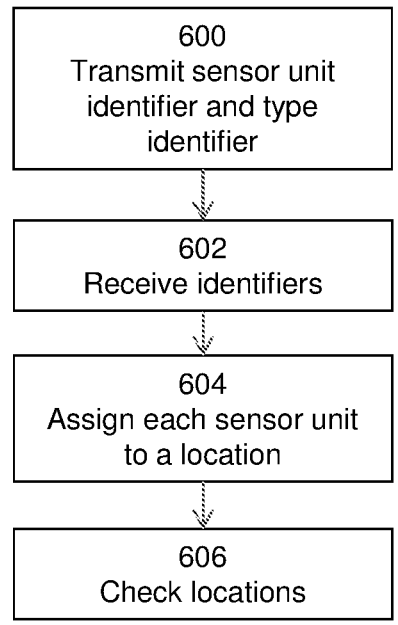
FIG. 6 is a flow diagram of a method of determining a location of a sensor unit in a sensor system.

FIG. 6 shows a flow diagram for a method of determining a location of a sensor unit in a sensor system, for example a location on a vehicle. The steps of FIG. 6 may be used in conjunction with the steps of FIG. 5, or separately.

The sensor units 104, 204 provided for a sensor system may not be entirely generic and may have different categories relating to their location. This contrasts with typical sensor units which are all the same.

There may be a range of different sensor units with each type being intended for a specific location, for example being located on a different wheel. For example, on a three axle bus there may be six sensor unit types employed: front nearside, front offside, middle nearside, middle offside, rear nearside and rear offside. Each sensor type may have a visual indicator, such as a colour code and/or alphanumeric code, and operatives installing the sensor units may be provided with instructions to use, for example, red sensor units on the front offside wheel and blue sensor units on the front nearside wheel etc. This also provides for a very simple daily maintenance check.

In addition to being colour-coded, sensor units may transmit information to indicate their type. Therefore, assuming a sensor unit is on the correct wheel for its type, the receiver will automatically know to where on the vehicle data from that sensor pertains. Data collected at the sensor units can then be attributed to a particular location, which will aid in rectification of any fault.

Using sensors specific to (e.g. wheel) location solves a problem of determining where a particular sensor unit is on a vehicle without the need for manual checking.

Referring to FIG. 6, a sensor unit 104 transmits 600 a sensor unit identifier and a type identifier. Each of these may be stored in memory 406.

The controller 102 receives 602 the transmitted identifiers and assigns 604 each identified sensor unit 104 to a location on the vehicle associated with the type identifier. Thereafter, the data received from each sensor unit 104 may be attributed to that location. For example, when sensor units are used, the data, such as wheel loosening data and/or tyre pressure data may be attributed to a particular wheel. This may be done without manual pairing of sensor units to locations. The operative fitting the sensor units only needs to ensure that the correct visual indicator is in the correct location.

A checker 318 of the controller 102 may perform a check that the sensor units 104 assigned to the controller 102 have locations corresponding to the actual locations on the vehicle. The checker may output a warning, if the check is not as expected. For example, if there are two near side front sensor units identified in the set of sensors to be assigned to the controller 102 then the checker 318 may issue an error message. Similarly, the checker 318 may issue an error message if a near side mid sensor unit is identified in the set when the vehicle only has four wheels, for example.

The checker 318 may also instigate a repeat of the assignment process shown in FIG. 5 when that is used in conjunction with the locating process shown in FIG. 6, if the check fails. If the problem is not resolved then an operative may need to perform a manual check that the correct sensor units are fitted in each location.

In exemplary methods and apparatus, sensor units may be fitted to wheels of a vehicle that are of a different size or radius. The important measure here is that the circumference of the wheel that is in contact with the surface of the road is different and so the radius of the wheel should include the radius of the tyre.

This may be the case, for example, when a vehicle is towing a trailer of a caravan. In that case, the angular rate (or other correlatable characteristic) of sensor units on the differently sized wheels will be proportionally related. This proportional relation is encompassed in the term correlation, as used herein. In such arrangements, the angular rate of one wheel will be a substantially constant factor of the angular rate of another wheel, even if they are of a different size. The sensor determiner may be configured to determine that such sensors belong to the same set, if the angular rates (or other correlatable characteristic) are proportional. This assessment may be done over a period of time.

In exemplary apparatus, sensor unit assignment to a vehicle 200a may occur without discrimination at the controller 102 between sensor units 104 fitted to the vehicle 200a and further sensor units 204, which may be fitted to another vehicle 200b. The sensor unit assigner 320 may be configured to assign all sensor from which valid identification data is received. That is, the sensor unit assigner 320 of the controller 102 may be configured to assign to the vehicle 200a the plurality of sensor units 104a-f fitted to the vehicle 102 and one or more further sensor units 204a-f not fitted to the vehicle 102. In exemplary arrangements, the sensor unit assigner 320 may be configured to assign to the vehicle all of the sensor units 104, 204 from which the receiver 304 receives identification data. This may be a suitable method when, for example, exemplary sensor units 104, 204 comprise a sensor that is not sensitive enough to collect data to a sufficient degree of accuracy to enable accurate correlation of the collected data at the controller 102 in the way described above.

It should be understood that that in exemplary arrangements all sensor units assigned to the vehicle 200a by the controller 102 are assumed to be fitted to the vehicle 200a, regardless of whether they are fitted to the vehicle 200a or another vehicle 200b. As such, any alerts received from an assigned sensor unit, such as a low tyre pressure alert, are assumed to relate to the vehicle 200a even if they are received from a sensor unit of the other vehicle 200b and are processed by the controller 102 as such.

Figure 7:
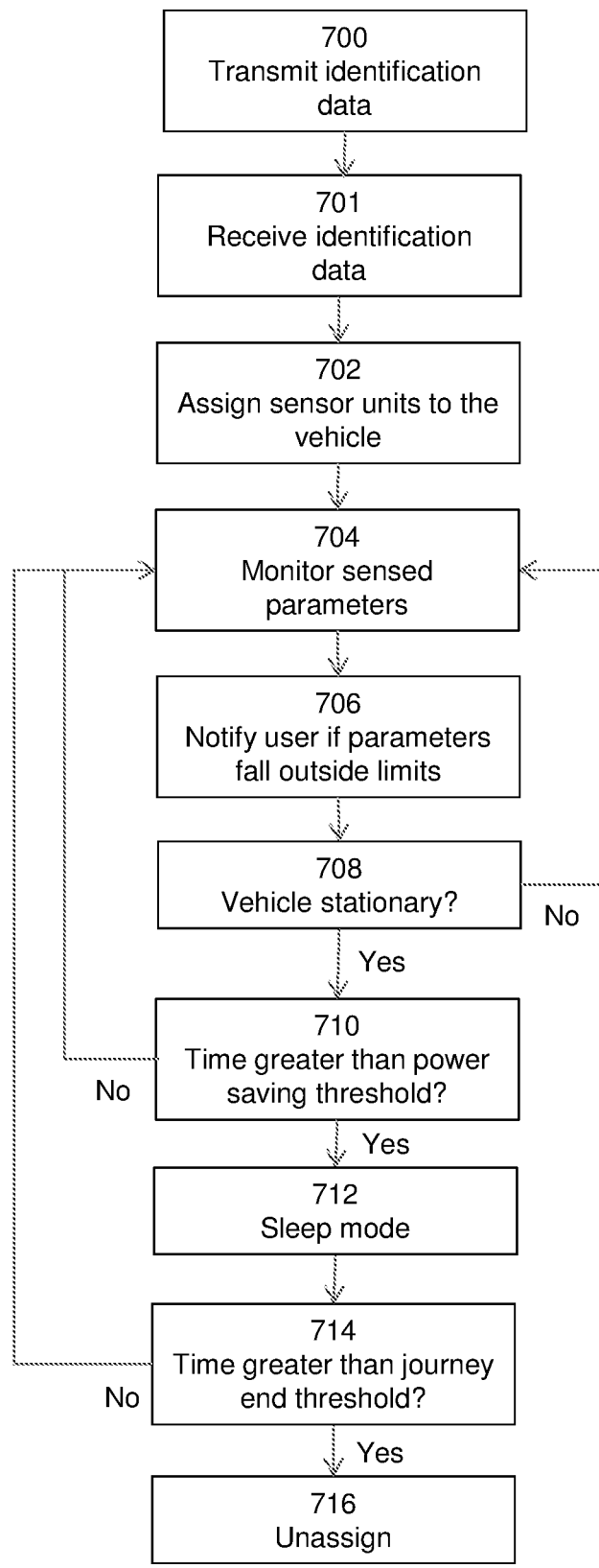
FIG. 7 is a flow diagram of a method for assigning a plurality of sensor units to a vehicle.

FIG. 7 is a flow diagram of an exemplary method for assigning to a vehicle 200a a plurality of sensor units without discrimination between sensor units fitted to the vehicle 200a and further sensor units not fitted to the vehicle 200a.

700: The sensor units 104, 204 transmit identification data to the controller 102. In exemplary methods and apparatus, the sensor units 104, 204 may be configured not to transmit the identification data until the motion of the sensor unit, as measured by a motion sensor 417, indicates that the vehicle speed has exceeded a sensor speed threshold value. In exemplary methods and apparatus, the motion sensor 417 may be an accelerometer. The sensor units 104, 204 may be configured to transmit the identification data during a predefined period of time, which may be 60 s, 70 s, 80 s, 90 s, 100 s or 110 s. The transmitter 402 may be configured to transmit the identification data at intervals throughout the predefined period. For example the transmitter 402 may be configured to transmit the identification data every 5 s during the predefined period. In further arrangements, the transmitter 402 may be configured to transmit the identification data a predefined number of times, such as 5 or more, 10 or more, 15 or more or 20 or more.

In this way, the probability of the sensor unit assigner 320 assigning to the vehicle 200a, sensor units 204 not fitted to the vehicle 200a is reduced. This is because in order for assignment of sensor units 204 fitted to another vehicle 200b to occur, the receiver 304 of the vehicle 200a would have to be within range of the sensor units 204 during the predefined period of the other vehicle 200b.

701: The receiver 304 of the controller 102 receives identification data from the plurality of sensor units 104 fitted to the vehicle 200a and at least one further sensor unit 204. The at least one further sensor unit 204 may be fitted to a further vehicle 200b.

In exemplary methods and apparatus, the vehicle motion monitor 322 of the controller 102 may monitor the speed of the vehicle 200a and determine whether it is greater than a predetermined vehicle speed (or assignment threshold value). If the vehicle motion monitor 322 determines that the speed of the vehicle 200a is greater than the assignment threshold value, it may alert the sensor unit assigner 320 to begin an assignment period, during which it may assign to the vehicle 200a any sensor unit from which identification data is received. In exemplary methods and apparatus, the sensor unit assigner 320 may begin the sensor assignment period once the vehicle 200a reaches a speed of 10 km/h, 15 km/h, 20 km/h or 25 km/h.

In exemplary methods and apparatus, the identification data need not comprise parameter data relating to a parameter of the wheels 106a-f of the vehicle 200a such as tyre pressure or temperature. The identification data may serve only to identify the individual sensor units for the purpose of assignment by the sensor unit assigner 320 to the vehicle 200a. The identification data may be unique identification data for each sensor unit.

702: The sensor unit assigner 320 assigns to the vehicle 200a all of the sensor units from which the receiver 304 receives identification data. In exemplary methods and apparatus, this may be undertaken during a sensor assignment period. As explained above, the sensor assignment period may begin once the vehicle motion monitor 320 has determined that the speed of the vehicle 200a exceeds the assignment threshold. In exemplary methods and apparatus, the sensor assignment period may be 60 s, 70 s, 80 s, 90 s, 100 s or 110 s. The sensor unit assigner 320 may be configured to assign to the vehicle 200a any sensor unit 104, 204 from which identification data is received during the sensor assignment period and to not assign to the vehicle 200a any sensor unit 104, 204 from which identification data is received during the sensor assignment period.

704: The receiver 304 receives parameter data from the sensor units 104, 204 and monitors the parameter data sensed by the sensor 146 of the sensor unit 104, 204. The parameter data may comprise one or more of: tyre pressure data, temperature data and wheel loosening data.

706: The data manager 324 is configured to monitor the parameter data and notify a user of the vehicle 200a if the parameter data is outside of a predetermined range, for example, if the tyre pressure drops below a threshold value. In exemplary methods and apparatus, if the data manager 324 determines that the parameter data is outside of a predetermined range and a notification is sent to the user of the vehicle 200a, data relating to the notification, such as the time and type of notification, may be stored in the memory 306 of the controller 102. In exemplary methods and apparatus, the notification data stored in the memory 306 of the controller may be deleted after a retention period. For example, the notification data may be stored in the memory 306 for a retention period of 4 weeks, 5 weeks, 6 weeks, 7 weeks or 8 weeks, beginning from the point at which the notification data was first logged by the data manager 324.

In this way, a record may be kept of whether users of a vehicle 200a have responded to the notifications they have received. This may be utilised by management to ensure that their bus or truck drivers cannot ignore the notifications.

708: The vehicle motion monitor 322 is configured to determine if the vehicle 200a is stationary. If not then the controller 102 is configured to continue to receive and monitor parameter data from the sensor units 104, 204.

710: If the vehicle 200a is stationary then the vehicle motion monitor 322 determines whether it has been stationary for a time period greater than a power save threshold. If the time period is not greater than the power save threshold then the controller 102 is configured to continue to receive and monitor parameter data from the sensor units 104, 204.

712: If the vehicle 200a is stationary for longer than the power save threshold time then the receiver 304 is configured to enter a low power mode. In the low power mode, the receiver 304 may be configured not to receive parameter and/or identification data from the sensor units 104, 204. Any sensor units 104, 204 assigned to the vehicle 200a remain assigned to the vehicle 200a during this power saving period, unless the vehicle motion monitor 322 determines that the vehicle is stationary for a period exceeding the stationary period. The power save threshold time may indicate that the vehicle has stopped temporarily along its journey, but the journey is not yet complete.

714: The vehicle motion monitor 322 determines whether the vehicle 200a has been stationary for a time period greater than a journey end threshold. If not then the receiver 304 "wakes" and enters a normal mode of operation and the controller 102 is configured to continue to receive and monitor parameter data from the sensor units 104, 204. The journey end threshold time may indicate that the vehicle has ended its journey.

716: If the vehicle motion monitor 322 determines that the vehicle 200a has been stationary for a time period greater than a journey end threshold, the sensor unit assigner 320 is configured to unassign all the sensor units 104, 204 from the vehicle. As the journey is ended, the method for assigning the sensors should begin again at the start of the next journey.

For example, the power save threshold may be a duration of 5 minutes and the journey end threshold may be of a duration of 15 minutes. As such, if the vehicle motion monitor 322 determines that the vehicle has been stationary for 5 minutes, the receiver may be placed into low power mode. If the vehicle motion monitor 322 determines that the vehicle remains stationary for a further 10 minutes, the vehicle motion monitor 322 may optionally alert the sensor unit assigner 320 to unassign any sensor units assigned to the vehicle 200a, although as discussed herein, in other arrangements, the sensor units are not unassigned, but remain in the memory. This may be advantageous as, in the case that there has been a leakage overnight, if all sensors are unassigned at the journey's end then an alarm will not be transmitted until after the corresponding sensor unit has been paired to the controller again.

In exemplary methods and apparatus, there may be further sensor assignment periods, within which the sensor unit assigner 320 may determine common sensor units from the identification data received by the receiver. The sensor unit assigner 320 may unassign from the vehicle 200*a* those sensor units that are not common to the initial sensor assignment period and the further sensor assignment period.

The automated assignment of sensor units to a vehicle in a simple, reliable way is a problem that the methods and apparatus disclosed herein address. The methods and apparatus use the combination of visually distinctive sensor units specific to (e.g. wheel) position and a measurement of a correlatable property of the sensor units on a given vehicle to detect automatically which sensor units are attached to the local vehicle, based on their identification data.

In exemplary methods and apparatus, assignment of sensor units 104, 204 to a controller 102 of a vehicle 200*a* may occur if the receiver 304 of the controller 102 receives first identification data and second identification data from the sensor units 102, 204. The receipt of the first and second identification data, optionally within defined time periods, may be considered valid identification data. This method may be suitable if the sensor units are fitted to a fleet of vehicles likely to commence their journey from the same destination.

In this situation, although the vehicle 200*a* may be within range of the sensor units 204 of one or more other vehicles 200*b* for long enough to receive first identification from sensor units fitted to those other vehicles, the inventors have realised that the vehicle 200*a* is unlikely to remain within range of the one or more other vehicles 200*b* for long enough to receive second identification data also. The likelihood of assigning a sensor unit that does not belong to the vehicle 200*a* is therefore further reduced.

Figure 8:
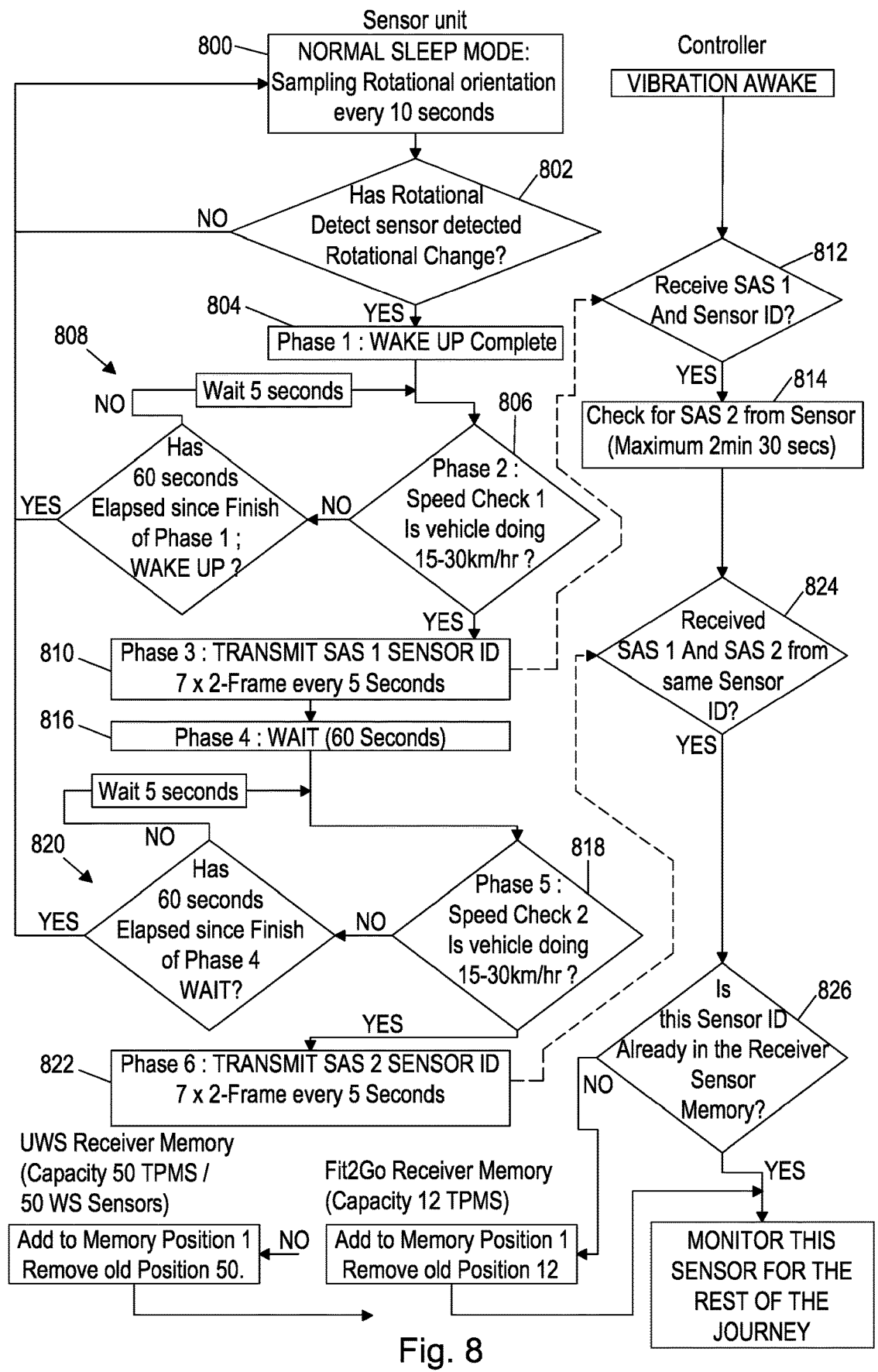
FIG. 8 is a flow diagram of a method for assigning a plurality of sensor units to a controller.

FIG. 8 is a flow diagram of an exemplary method for assigning a plurality of sensor units 104, 204 to a controller 102 of a vehicle 200*a*.

800: The sensor unit 104 of the vehicle 200*a* is in a low power (or sleep) mode in order to reduce energy usage. In the low power mode the sensor unit 104 may have reduced functionality. In particular, the motion sensor 417 of the sensor unit 104 may have reduced functionality and may be configured only to sense motion necessary to wake the sensor unit 104 from low power mode. For example, the motion sensor 417 may be configured to determine a change in angular (or rotational) position of the sensor unit 104.

802: In the low power mode, the motion sensor 417 is configured to determine the rotational position of the sensor unit 104. The motion sensor 417 may determine the rotational position of the sensor unit 104 at set intervals. For example, the motion sensor 417 may be configured to determine the rotational position of the sensor unit 104 every 5 s, 10 s, 15 s or 20 s. Alternatively, the motion sensor 417 may be configured to detect any change in rotational position.

If a change in rotational position is sensed, the motion sensor 417 determines whether the change in rotational position is greater than a rotation threshold value. If the change in rotational position of the sensor unit 104 is not greater than the threshold, the sensor unit 104 remains in the low power mode with reduced functionality and the motion sensor 417 continues to determine the rotational position of the sensor unit 104 as described above.

804: If the motion sensor 417 determines that the change in rotational position of the sensor unit 104 is greater than the threshold, the sleep controller 415 is configured to "wake-up" the sensor unit 104 and exit the low power mode such that full operation of the sensor unit 104 is possible. For example, the sensor unit 104 may be configured to exit the low power mode if the motion sensor 417 determines that the change in rotational position of the sensor unit 104 is greater than: 70°, 80°, 90° 100° or 110°. Once the sensor unit 104 has exited the low power mode, the sensor unit 104 may have full functionality. In particular, the motion sensor 417 may have full functionality.

806: The motion sensor 417 is configured to determine whether a first speed of the sensor unit 104 is greater than a first speed threshold. In this case, the speed of the sensor unit 104 may provide a proxy for the speed of the vehicle or may be used to determine the speed of the vehicle. In exemplary methods and apparatus, the motion sensor 417 may be configured to determine whether the first speed of the sensor unit 104 indicates that the vehicle speed is greater than 10 km/hr, 15 km/hr, 20 km/hr, 25 km/hr, 30 km/hr or that the vehicle speed is in a range from 15 km/hr to 30 km/hr.

808: The motion sensor 417 may be configured to determine whether the first speed of the sensor unit 104 is greater than the first speed threshold a plurality of times during a first checking period, optionally until such time as the first speed of the sensor unit is determined to be greater than the first speed threshold or the first checking period expires.

For example, in the example of FIG. 8, if the motion sensor 417 determines that the first speed of the sensor unit 104 is not greater than the first speed threshold, the sleep controller 415 determines whether the first checking period (in this case 60 seconds since exiting low power mode) has expired. If the answer is yes, the sleep controller 415 places the sensor nit 104 into low power mode, as in 800. If the answer is no, the motion sensor 417 waits for a period of time (in this case 5 seconds) before determining the first speed again, as in 806.

810: The transmitter 402 of the sensor unit 104 transmits first identification data to the controller 102 of the vehicle 200*a* if the motion sensor 417 determines that the first speed of the sensor unit 104 exceeds the first threshold during the first checking period. In exemplary methods and apparatus, the transmitter 402 may be configured to transmit the first identification data to the controller 102 a plurality of times during a first transmission period, which in the case of FIG. 8 results in the first identification data being transmitted every 5 seconds for a total of seven times.

The identification data may serve only to identify the individual sensor units for the purpose of assignment by a sensor unit assigner 320 to the controller 102. The identification data may be unique identification data for each sensor unit.

812: The receiver 304 of the controller 102 receives the first identification data. The control unit is configured to receive and accept first identification from any sensor unit 104, 204 whether fitted to the vehicle 200*a* or not.

814: If the first identification data is received from a sensing unit, the sensor unit assigner 320 enters a listening period (150 seconds in the example of FIG. 8) during which it expects to receive second identification data from the same sensor unit.

816: After transmission of the first identification data at 810, the sensor unit 104 waits for a period of time, which in the case of FIG. 8 is 60 s. During the waiting period, the motion sensor 417 is configured not to determine the speed of the sensor unit and the transmitter 402 is configured not to transmit identification data.

818: The motion sensor 417 determines whether the speed of the sensor unit 104 is greater than a second speed threshold. This is termed a second speed of the sensor unit herein. The second speed threshold may be the same as the first speed threshold.

820: As at 808, the motion sensor 417 determines the second speed of the sensor unit 104 a plurality of times during a second checking period. The second checking period may begin when the waiting period ends. This process is broadly the same mutatis mutandis as step 808 and is not repeated here. In exemplary methods and apparatus, the first and second checking periods are of the same duration. In further methods and apparatus, the first checking period and the second checking period may be of different durations.

822: The transmitter 402 of the sensor unit 104 transmits second identification data to the controller 102 of the vehicle, if the motion sensor 417 determines that the second speed of the sensor unit 104 exceeds the second threshold during the second checking period. The transmitter 402 may be configured to transmit the second identification data in the same way as described above for transmission of the first identification data. The first identification data and the second identification data may each comprise the unique identification data for each sensor unit.

824: The receiver 304 of the controller 102 receives the second identification data from the sensor unit 104 and determines whether the second identification data is received within the listening period defined in 814 and is received from a sensor unit for which first identification data has been received.

826: If the second identification data is received within the listening period defined in 814 and is received from a sensor unit for which first identification data has been received, the sensor unit assignor 320 is configured to assign to the controller 102 of the vehicle 200*a*, the sensor units 104, 204 from which both first identification data and second identification data is received. It is noted that the sensor unit assigner 320 does not discriminate between sensor units 104 fitted to the vehicle 200*a* and sensor units 204 not fitted to the vehicle and may assign both types of sensor unit to the controller 102.

In exemplary methods and apparatus, the sensor unit assigner 320 of the controller 102 is configured to check whether the sensor unit 104, 204 from which the first identification data and the second identification data has been received has previously been assigned to the controller 102. This may be done by retrieving from memory 306 data relating to previously assigned sensor units, which the memory 306 is configured to store. The data relating to previously assigned sensor units may uniquely identify each sensor unit and may comprise the first and/or second identification data.

If the sensor unit assigner 320 determines that the sensor unit 104, 204 has previously been assigned to the controller 102, the sensor unit 104, 204 is not stored again in the memory 306.

If the sensor unit assignor 320 determines that the sensor unit 104, 204 from which first identification data and second identification data is received has not previously been assigned to the controller 300, the data relating to the sensor unit 104, 204 is stored in the memory 306 of the controller. Therefore, when the vehicle 200*a* begins any subsequent journeys, the sensor unit 104, 204 will already be stored in memory 306 and assigned to the controller 300. As such, there is no requirement for the sensor unit 104, 204 to reassign itself at the beginning of a new journey as all sensor units stored in the memory 306 are automatically assigned to the controller 102 by the sensor unit assignor 320. Data sensed by stored sensor units 104, 204 will be monitored for the remainder of the vehicle's journey and any subsequent journeys.

The memory 306 of the controller may be configured to store a specific number of previously assigned sensor units 104, 204. In the example of FIG. 8, different numbers of previously assigned sensor units 104, 204 may be stored depending on the system in which they operate. There may be, for example, up to 12 TPMS sensor units stored for a TPMS system for a car (and trailer/caravan), or up to 50 sensor units for a system comprising both TPMS sensor units and wheel loss sensor units for trucks, trailers and buses). The memory 306 may operate on a first in, first out basis, in that when a new sensor unit is stored, the oldest sensor unit is deleted if the maximum number of sensor units storable has been reached.

The above method reduces the likelihood of assigning to the controller 102, sensor units that do not belong to the vehicle 200*a*. This is because in order for a sensor unit 204 belonging to another vehicle 200*b* to be assigned to the controller 102, the below conditions would have to be met:

(1) The further vehicle 200*b* would need to be within range of the vehicle 200*a* for long enough for the sensor units 204 of the vehicle 200*b* to transmit the first identification data, undergo the waiting period, and transmit the second identification data; and (2) In addition to (1) the other vehicle 200*b* would have to be travelling at a speed greater than the first threshold and the second threshold while within range of the vehicle 200*a* in order to trigger transmission of the first identification data and second identification data.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A sensor unit for use in a vehicle sensor system comprising a controller and at least one further sensor unit, the sensor unit comprising:
   a motion sensor configured to determine a first speed of the sensor unit; and
   a transmitter configured to transmit first identification data to the controller if the first speed of the sensor unit exceeds a first threshold,
      wherein the motion sensor is further configured to determine a second speed of the sensor unit a period of time after determination of the first speed of the sensor unit,
   and wherein the transmitter is configured to transmit to the controller second identification data if the second speed of the sensor unit exceeds a second threshold.

2. A sensor unit according to claim 1, wherein the motion sensor is configured to determine the second speed of the sensor unit if the transmitter has transmitted the first identification data.

3. A sensor unit according to claim 1, wherein the transmitter is configured to transmit each of the first and second identification data a plurality of times within first and second transmission periods respectively.

4. A sensor unit according to claim 1, further comprising a sleep controller configured to place the sensor unit in a low power mode if the first speed of the sensor unit does not exceed the first threshold within a first checking period and/or the second speed of the sensor unit does not exceed the second threshold within a second checking period.

5. A sensor unit according to claim 4, wherein the motion sensor is configured to determine the first and second speeds of the sensor unit a plurality of times within the first and second checking periods respectively, and further configured to stop determining the first and second speeds of the sensor unit after expiry of the corresponding checking period.

6. A sensor unit according to claim 1, wherein the motion sensor is configured to sense a change in rotational position of the sensor unit and to determine the first speed of the sensor unit if the sensed change in rotational position is above a threshold.

7. A sensor unit according to claim 1, wherein the first threshold and the second threshold have the same value.

8. A method for operation of a sensor unit for use in a vehicle sensor system comprising a controller and at least one further sensor unit, the method comprising:
   determining, by a motion sensor, a first speed of the sensor unit; and
   transmitting, by a transmitter, first identification data to the controller if the first speed of the sensor unit exceeds a first threshold;
      determining, by the motion sensor, a second speed of the sensor unit a period of time after determination of the first speed of the sensor unit; and
   transmitting, by the transmitter second identification data to the controller if the second speed of the sensor unit exceeds a second threshold.

9. A method according to claim 8, wherein the motion sensor determines the second speed of the sensor unit if the transmitter has transmitted the first identification data.

10. A method according to claim 8, wherein the transmitter transmits each of the first and second identification data a plurality of times within first and second transmission periods respectively.

11. A method according to claim 9, further comprising a sleep controller placing the sensor unit in a low power mode if the first speed of the sensor unit does not exceed the first threshold within a first checking period and/or the second speed of the sensor unit does not exceed the second threshold within a second checking period.

12. A method according to claim 11, wherein the motion sensor determines the first and second speeds of the sensor unit a plurality of times within the first and second checking periods respectively, and stops determining the first and second speeds of the sensor unit after expiry of the corresponding checking period.

13. A method according to claims 8, wherein the motion sensor senses a change in rotational position of the sensor unit and determines the first speed of the sensor unit if the sensed change in rotational position is above a threshold.

14. A controller for use in a vehicle sensor system for assigning a plurality of sensor units to a vehicle, the controller comprising:
   a receiver configured to receive first identification data from at least one of the plurality of sensor units, and further configured to receive second identification data from the at least one of the plurality of sensor units a period of time later; and a sensor unit assigner configured to assign to the controller the at least one of the plurality of sensor units if the first identification data and the second identification data are received.

15. A controller according to claim 14, further comprising a memory configured to store data relating to a plurality of previously assigned sensor units, and wherein the sensor unit assigner is configured to retrieve data from the memory to determine whether the at least one of the plurality of assigned sensors has previously been assigned to the controller and to store data relating to the at least one assigned sensors in the memory if it has not been previously assigned to the controller.

16. A controller according to claim 15, wherein the memory is configured to store data relating to a maximum number of the most recent sensor units assigned to the controller.

17. A controller according to claim 15, wherein the sensor unit assigner is configured to retrieve the data relating to the previously assigned sensor units from the memory at the beginning of a journey of the vehicle and to assign to the controller previously assigned sensor units corresponding to the retrieved data.

18. A controller according to any of claim 14, wherein the sensor unit assigner is configured to assign the at least one of the plurality of sensor units to the controller if the second identification data is received within a listening period beginning with receipt of the first identification data.

19. A vehicle sensor system comprising:
   a plurality of sensor units according to claim 1; and
   a controller comprising:
      a receiver configured to receive first identification data from at least one of the plurality of sensor units, and further configured to receive second identification data from the at least one of the plurality of sensor units a period of time later; and
      a sensor unut assigner configured to assign to the controller the at least one of the plurality of sensor units if the first identification data and the second identification data are received.

20. A vehicle comprising the vehicle sensor system of claim 19.

* * * * *